CERT OF CORR
ON LAST PAGE

United States Patent Office 3,100,773
Patented Aug. 13, 1963

3,100,773
METHOD OF PREPARING AMINOAZOLEDI-SULFIDES
George D. Louth, Doylestown, and Marlyn J. Brock, Akron, Ohio, assignors to The Firestone Tire & Rubber Company, Akron, Ohio, a corporation of Ohio
No Drawing. Filed May 20, 1959, Ser. No. 814,389
8 Claims. (Cl. 260—247.1)

This invention relates to the preparation of aminoazole disulfides, also known as azolethiosulfenamides.

Aminoazole disulfides are powerful accelerators and curing agents for the vulcanization of natural rubber and the synthetic, sulfur-vulcanizable diene rubbers. These disulfides are especially useful in pneumatic tire tread stocks, in which a powerful but delayed-action, non-scorching, curing combination is needed for successful factory processing of the stocks.

The compounds produced in accordance with the present invention are aminoazole disulfides, represented by the formula

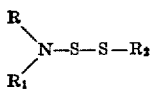

in which R and $R_1$ the the same or different aliphatic, cycloaliphatic, or aralkyl groups or R and $R_1$ together form a single chain (which can contain —O—, —NH— or —S—) constituting with the attached nitrogen atom a heterocyclic radical, $R_1$ can be hydrogen, and $R_2$ represents a member of the class consisting of thiazoles, oxazoles and imidazoles.

The invention provides a method of making such aminoazole disulfides by interacting an amine monosulfide or an amine disulfide with a 2-mercapto azole.

The preparation reaction utilizing an amine monosulfide appears to conform to the following equation, in which 2-mercaptobenzothiazole and morpholine monosulfide represent typical reactants:

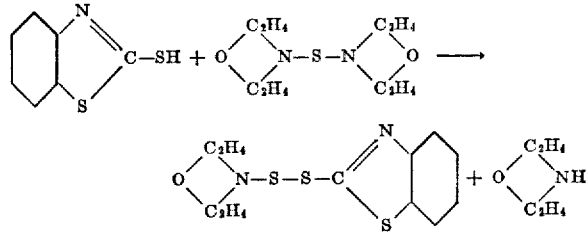

The use of an additional mole of the mercapto azole will convert the free amine produced by the metathesis into into the amine salt of the mercapto azole, and this salt is also a vulcanization accelerator.

The preparation reaction utilizing an amine disulfide appears to conform to the following equation, in which 2-mercaptobenzothiazole and morpholine disulfide represent typical reactants:

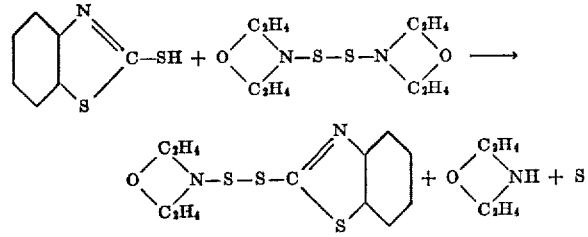

Again the free amine can be converted into the amine salt by using another mole of the mercapto azole.

It has been found that an alkali metal salt of the mercapto azole can be substituted for the mercapto azole in the latter of the two reactions shown above. Presumably, sodium sulfide is formed instead of free sulfur.

The invention is illustrated by the following examples.

EXAMPLE 1

*Preparation of 2-(4-Morpholinyldithio)benzothiazole*

One hundredth molar quantities of dithiomorpholine (2.36 grams) and 2-mercaptobenzothiazole (1.67 grams) were dissolved in 30 ml. of absolute ethyl alcohol with slight warming. The alcohol was allowed to evaporate overnight at room temperature. A solid product was obtained. This product was washed once with 20 ml. of cold diethyl ether and filtered. The residual product (2.7 grams) was purified by extracting once with a little warm ether (to remove morpholine and sulfur) and then recrystallizing from alcohol. The recrystallized product melted at 132–133° C. (uncorrected).

Analysis:

|  | Calculated for N-morpholinyl benzothiazole-2-thiosulfenamide | Found |
| --- | --- | --- |
| Percent carbon | 46.50 | 46.47 |
| Percent hydrogen | 4.26 | 4.29 |
| Percent nitrogen | 9.86 | 9.97 |
| Percent sulfur | 33.8 | 33.5 |

The X-ray diffraction diagram of the purified product was completely different from the X-ray diagrams of the starting materials and of 2,2'-dithio-bis-benzothiazole.

EXAMPLE 2

*Preparation of 2-(4-Morpholinyldithio)Benzothiazole*

One hundredth of a mole of morpholine disulfide (2.36 grams) was dissolved in hot alcohol and 1.9 grams of the sodium salt of 2-mercaptobenzothiazole (0.01 mole) was added. The first precipitate which formed was identified as morpholine disulfide. Upon concentration of the alcoholic solution a second precipitate was isolated and found by X-ray analysis to contain N-morpholinyl benzothiazole-2-thiosulfenamide (subject compound).

EXAMPLE 3

*Preparation of 2-(4-Morpholinyldithio)Benzothiazole*

One hundredth of a mole of morpholine disulfide (2.36 grams) and 1.67 grams of 2-mercaptobenzothiazole (0.01 mole) were melted together. Upon cooling a viscous yellow liquid was obtained, and a morpholine odor was detected, indicating that a reaction had taken place. Upon stirring the liquid solidified into a pasty product. An X-ray diffraction diagram of this product showed the presence of the desired disulfide (subject compound) because of its similarity to the X-ray diagram of the purified product of Example 1.

EXAMPLE 4

*Preparation of 2-(4-Morpholinyldithio)Benzothiazole*

One hundredth molar quantities of morpholine monosulfide (2.0 grams) and of 2-mercaptobenzothiazole (1.67 grams) were dissolved in boiling chloroform. The solution turned dark, and morpholine issued therefrom as the mixture boiled. Upon evaporation of the mixture to dryness a solid product was obtained. After purifying the product by washing with ether and drying, it melted at 131–133° C. Its X-ray diffraction diagram was identical to that of the product of Example 1.

EXAMPLE 5

*Preparation of 2-(4-Morpholinyldithio)Benzothiazole*

Molar quantities of morpholine disulfide (236 grams) and of 2-mercaptobenzothiazole (167 grams) were used for a large-scale preparation of subject compound. The morpholine disulfide was dissolved in hot absolute alcohol and the mercaptobenzothiazole was added. As the solution cooled, a precipitate settled out. The precipitate was separated by filtration and was washed with ether. The dried product melted at 131–133° C. It was compounded in a natural rubber tire tread stock reinforced by HAF carbon black and found to be a powerful delayed-action accelerator of vulcanization by free sulfur and also to be a powerful curing agent in the absence of free sulfur and other accelerator.

EXAMPLE 6

*Preparation of N-Morpholinyl Benzimidazole-2-Thiosulfenamide*

One hundredth molar quantities of morpholine disulfide (2.36 grams) and 2-mercaptobenzimidazole (1.5 grams) were dissolved in absolute alcohol. The solution turned yellow, indicating that a reaction had taken place. Part of the alcohol was boiled off, and the odor of morpholine was detected. A precipitate, which formed upon cooling the solution, was separated and dried. The X-ray diffraction diagram of this product showed it to contain some unreacted 2-mercaptobenzimidazole and also an additional substance different from the starting materials and believed to possess the following structure:

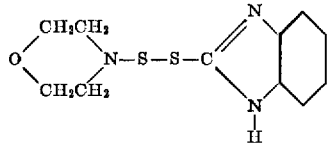

EXAMPLE 7

*Preparation of N-Morpholinyl Benzimidazole-2-Thiosulfenamide*

Morpholine disulfide and 2-mercaptobenzimidazole were melted together in equal molar quantities. The melt became yellow, and the odor of morpholine was detected. The viscous liquid melt solidified upon stirring. The product was recrystallized from alcohol, and the X-ray diffraction diagram was obtained. The X-ray pattern showed the presence of unreacted 2-mercaptobenzimidazole and of another substance different from either of the reactants or morpholine, and thus concluded to be subject compound.

EXAMPLE 8

*Preparation of N-Cyclohexyl Benzothiazole-2-Thiosulfenamide*

One-quarter gram of cyclohexylamine disulfide and 0.2 gram of 2-mercaptobenzothiazole were melted together and heated on a warm hot plate for about 5 minutes. The melt was cooled and ether was added. A solid product was obtained. The X-ray diffraction diagram showed that the product was different from the starting materials and also different from the cyclohexylammonium salt of mercaptobenzothiazole, 2,2'-dithio-bis-benzothiazole and N-cyclohexyl-2-benzothiazole sulfenamide. Therefore, the product was indicated to be subject compound of the following formula:

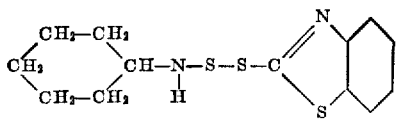

Additional examples of aminozole disulfides can be prepared by using other appropriate amine monosulfides or disulfides and other mercaptoazoles in lieu of those shown in the examples. Thus, 2-(dimethylaminodithio)benzothiazole is prepared by reacting 2-mercaptobenzothiazole with dimethylamine disulfide; 2-(di-n-propylaminodithio)benzothiazole is made from N,N'-dithio-bis-di-n-propylamine and 2-mercaptobenzothiazole; and 2-(n-butylaminodithio)-(4,5-dimethylthiazole) is prepared by reacting N,N'-dithio-bis-n-butylamine with 2-mercapto-4,5-dimethylthiazole.

The amine sulfides utilized in the invention can be illustrated by the formula

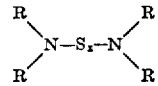

in which the R's are the same or different aliphatic, cycloaliphatic or aralkyl radicals, one R on each nitrogen can be hydrogen, the two R's on one or both nitrogen atoms are joined to form a single chain (which can contain —O—, —NH— or —S—) constituting with the attached nitrogen atom a heterocyclic radical, and $x$ represents one of the integers 1 and 2.

Other amine sulfides in addition to those disclosed hereinabove are the following:

N,N'-thio-bis-dimethylamine
N,N'-thio-bis-diethylamine
N,N'-thio-bis-di-n-propylamine
N,N'-thio-bis-di-n-butylamine
N,N'-thio-bis-di-isobutylamine
N,N'-thio-bis-di-n-amylamine
N,N'-thio-bis-di-isoamylamine
N,N'-thio-bis-di-n-hexylamine
N,N'-thio-bis-di-n-heptylamine
N,N'-thio-bis-di-n-octylamine
N,N'-thio-bis-di-benzylamine
N,N'-thio-bis-methyl cyclohexylamine
N,N'-thio-bis-ethyl cyclohexylamine
N,N'-thio-bis-(thiomorpholine)
N,N'-thio-bis-(4-N-ethyl piperazine)
N,N'-thio-bis-piperidine
N,N'-thio-bis-pyrrolidine
N,N'-dithio-bis-diethylamine
N,N'-dithio-bis-di-n-butylamine
N,N'-dithio-bis-di-isobutylamine
N,N'-dithio-bis-di-n-amylamine
N,N'-dithio-bis-di-isoamylamine
N,N'-dithio-bis-n-hexylamine
N,N'-dithio-bis-di-n-heptylamine
N,N'-dithio-bis-di-n-octylamine
N,N'-dithio-bis-di-benzylamine
N,N'-dithio-bis-methyl cyclohexylamine
N,N'-dithio-bis-ethyl cyclohexylamine
N,N'-dithio-bis-(thiomorpholine)
N,N'-dithio-bis-(4-N-ethyl piperazine)
N,N'-dithio-bis-piperidine
N,N'-dithio-bis-pyrrolidine The N,N'-thio-bis-di-secondary amines and N,N'-dithio-bis-di-secondary amines constitute a preferred class.

The mercapto azoles which can be used include the mercaptothiazoles, mercaptoimidazoles and the mercaptooxazoles. Either aliphatic or aromatic azoles can be used. Representative examples are:

2-mercaptothiazole
2-mercaptooxazole
2-mercaptoimidazole
2-mercapto-4-methylthiazole
2-mercapto-4-methyloxazole
2-mercapto-4-methylimidazole
2-mercapto-4-ethylthiazole
2-mercapto-4-methyloxazole
2-mercapto-4-methylimidazole
2-mercapto-4-n-propylthiazole
2-mercapto-4-n-propyloxazole
2-mercapto-4-n-propylimidazole
2-mercapto-4-n-butylthiazole 2-mercapto-4-n-butyloxazole
2-mercapto-4-n-butylimidazole
2-mercapto-4,5-dimethylthiazole
2-mercapto-4,5-dimethyloxazole
2-mercapto-4,5-dimethylimidazole
2-mercapto-4,5-diethylthiazole
2-mercapto-4,5-diethyloxazole
2-mercapto-4,5-diethylimidazole
2-mercapto-4,5-di-n-propylthiazole
2-mercapto-4,5-di-n-propyloxazole
2-mercapto-4,5-di-n-propylimidazole
2-mercapto-4,5-di-n-butylthiazole
2-mercapto-4,5-di-n-butyloxazole
2-mercapto-4,5-di-n-butylimidazole
4-phenyl-2-mercaptothiazole
4-phenyl-2-mercaptooxazole
4-phenyl-2-mercaptoimidazole
4-phenyl-5-methyl-2-mercaptothiazole
4-phenyl-5-methyl-2-mercaptooxazole
4-phenyl-5-methyl-2-mercaptoimidazole
2-mercaptobenzothiazole
4-phenyl-2-mercaptobenzothiazole
6-phenyl-2-mercaptobenzothiazole
2-mercapto-tetrahydrobenzothiazole
2-mercapto-naphthothiazole Solvents can often be used to an advantage in carrying out the invention. Suitable solvents are the lower aliphatic alcohols such as methanol, ethanol, isopropanol, n-propanol, n-butanol, and other common organic solvents such as chloroform, benzene, trichloroethylene, toluene and xylene.

Higher or lower temperatures than the reaction temperatures of the examples can be employed. The reaction temperature is not critical, but it is desirable to use a temperature that will allow a reasonably rapid rate of reaction, so that the preparation can be carried out economically.

While certain representative embodiments and details are shown herein for the purpose of illustrating the invention, it will be apparent to those skilled in the art that various modifications may be made therein without departing from the spirit or scope of the invention.

We claim:
1. The method of preparing an amino azole disulfide which comprises reacting (a) an amine disulfide of the general formula:

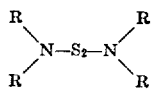

in which the nitrogen substituents, R's, are selected from the class consisting of aliphatic radicals, cycloaliphatic radicals, aralkyl radicals and cycloaliphatic rings formed by the joining together of the pair of R's on a nitrogen atom with (b) a mercapto azole selected from the class consisting of mercaptothiazoles, mercaptoimidazoles, and mercaptooxazoles, said amine sulfide being reacted in the ratio of one mole of said amine sulfide to from one to two moles of said mercapto azole.

2. The method of preparing an aminothiazole disulfide which comprises reacting (a) an amine disulfide of the general formula

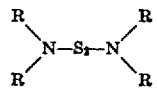

in which the nitrogen substituents, R's, are radicals from the class consisting of aliphatic radicals, cycloaliphatic radicals, aralkyl radicals and cycloaliphatic rings formed by joining together of the pairs of R's on a nitrogen atom with (b) a 2-mercaptothiazole, said amine sulfide being reacted in the ratio of one mole of said amine sulfide to from one to two moles of said mercaptothiazole.

3. The method of preparing an aminobenzothiazole disulfide which comprises reacting (a) an amine disulfide of the general formula

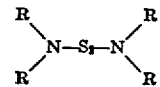

in which the R's are selected from the class consisting of aliphatic radicals, cycloaliphatic radicals, aralkyl radicals, and cycloaliphatic rings formed by the joining together of the pair of R's on a nitrogen atom with (b) a 2-mercaptobenzothiazole, said amine sulfide being reacted in the ratio of one mole of said amine sulfide to from one to two moles of said mercaptobenozthiazole.

4. The method of preparing an aminobenzothiazole disulfide which comprises reacting in a solvent (a) an amine disulfide of the general formula

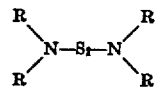

in which the R's are selected from the class consisting of aliphatic radicals, cycloaliphatic radicals, aralkyl radicals and cycloaliphatic rings formed by the joining together of the pair of R's on a nitrogen atom with (b) a 2-mercaptobenzothiazole, said amine sulfide being reacted in the ratio of one mole of said amine sulfide to from one to two moles of said mercaptobenzothiazole.

5. The method of preparing 2-(4-morpholinyldithio) benzothiazole which comprises reacting N,N'-dithio-bis-morpholine with 2-mercaptobenzothiazole.

6. The method of preparing an amino azole disulfide which comprises reacting (a) an amine disulfide of the formula

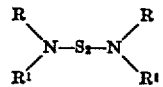

in which the R's are selected from the group consisting of aliphatic radicals, cycloaliphatic radicals and aralkyl radicals, the R's are selected from the group consisting of hydrogen, aliphatic radicals, cycloaliphatic radicals and aralkyl radicals, and R and $R^1$ attached to a single nitrogen atom can be joined with said atom to constitute a heterocyclic radical, with (b) a mercapto azole selected from the class consisting of mercaptothiazoles, mercaptoimidazoles, mercaptooxazoles and the alkali metal salts of said mercapto azoles, said amine sulfide being reacted in the ratio of one mole of said amine sulfide to from one to two moles of said mercapto azole.

7. The method of preparing 2-(4-morpholinyldithio)-benzimidazole which comprises reacting N,N'-dithio-bis-morpholine with 2-mercaptobenzimidazole.

8. The method of preparing N-cyclohexyl benzothiazole-2-thiosulfenamide which comprises reacting cyclohexylamine disulfide with 2-mercaptobenzothiazole.

References Cited in the file of this patent
UNITED STATES PATENTS
2,835,670    Hardman _____ May 20, 1958

UNITED STATES PATENT OFFICE
CERTIFICATE OF CORRECTION

Patent No. 3,100,773                               August 13, 1963

George D. Louth et al.

It is hereby certified that error appears in the above numbered patent requiring correction and that the said Letters Patent should read as corrected below.

Column 1, line 26, for "the", first occurrence, read -- are --; line 53, strike out "into"; column 6, line 49, for "R's" read -- $R^1$'s --.

Signed and sealed this 15th day of March 1966.

(SEAL)
Attest:

ERNEST W. SWIDER
Attesting Officer

EDWARD J. BRENNER
Commissioner of Patents

UNITED STATES PATENT OFFICE
CERTIFICATE OF CORRECTION

Patent No. 3,100,773                                    August 13, 1963

George D. Louth et al.

It is hereby certified that error appears in the above numbered patent requiring correction and that the said Letters Patent should read as corrected below.

Column 1, line 26, for "the", first occurrence, read -- are --; line 53, strike out "into"; column 6, line 49, for "R's" read -- $R^1$'s --.

Signed and sealed this 15th day of March 1966.

(SEAL)
Attest:

ERNEST W. SWIDER                                         EDWARD J. BRENNER
Attesting Officer                                              Commissioner of Patents